(12) United States Patent
Rosas et al.

(10) Patent No.: US 11,358,568 B2
(45) Date of Patent: Jun. 14, 2022

(54) WIPER BLADE ADAPTER ATTACHMENT SYSTEM

(71) Applicant: Illinois Tool Works Inc., Glenview, IL (US)

(72) Inventors: Martin William Rosas, Cypress, TX (US); Subramaniam Shanmugham, Sugar Land, TX (US)

(73) Assignee: Illinois Tool Works Inc., Glenview, IL (US)

( * ) Notice: Subject to any disclaimer, the term of this patent is extended or adjusted under 35 U.S.C. 154(b) by 199 days.

(21) Appl. No.: 16/408,084

(22) Filed: May 9, 2019

(65) Prior Publication Data

US 2019/0344757 A1 Nov. 14, 2019

Related U.S. Application Data

(60) Provisional application No. 62/670,440, filed on May 11, 2018.

(51) Int. Cl.
*B60S 1/40* (2006.01)
*B60S 1/38* (2006.01)

(52) U.S. Cl.
CPC .......... *B60S 1/4003* (2013.01); *B60S 1/4006* (2013.01); *B60S 1/4067* (2013.01); *B60S 1/387* (2013.01); *B60S 1/3856* (2013.01); *B60S 1/3858* (2013.01)

(58) Field of Classification Search
CPC ...... B60S 1/4038; B60S 1/3858; B60S 1/387; B60S 1/3856; B60S 1/4009; B60S 1/4054; B60S 1/4003; B60S 1/4006; B60S 1/4067; B60S 1/40; B60S 1/4096

USPC .......... 15/250.32, 250.43, 250.44, 250.201, 15/250.361
See application file for complete search history.

(56) References Cited

U.S. PATENT DOCUMENTS

| 8,505,151 | B2 * | 8/2013 | Depondt | B60S 1/387 |
| | | | | 15/250.32 |
| 9,507,245 | B1 | 11/2016 | Druker et al. | |
| 2009/0199357 | A1 * | 8/2009 | Thienard | B60S 1/4009 |
| | | | | 15/250.32 |
| 2015/0258967 | A1 | 9/2015 | Lepper et al. | |
| 2016/0207502 | A1 | 7/2016 | Avasiloaie et al. | |

FOREIGN PATENT DOCUMENTS

| DE | 102009014700 A1 * | 10/2009 | ............ B60S 1/4003 |
| EP | 2020351 A1 * | 2/2009 | ............ B60S 1/3853 |
| WO | 2010028866 A1 | 3/2010 | |

* cited by examiner

*Primary Examiner* — Katina N. Henson
(74) *Attorney, Agent, or Firm* — Blue Filament Law PLLC (57) ABSTRACT

A system and method are provided that enables windshield wiper blades to be replaced without the complexity of removing and reattaching adapters to the wiper arms with every wiper blade replacement cycle. The wiper blade adapter is reusable and stays connected to the windshield wiper arm while providing a simple connecting system that enables the attachment of the wiper blade to the base of the adapters. The adapters are made of engineered plastic that does not wear as quickly as the rubber squeegee and does not need to be replaced as often as the wiper blade. The reusable wiper blade adapter employs a simple mating connector on the wiper blade that provides for an intuitive motion to attach and detach from the base of the adapter thus providing for a simpler blade replacement process.

11 Claims, 7 Drawing Sheets

WIPER BLADE ADAPTER ATTACHMENT SYSTEM

RELATED APPLICATIONS

This application claims priority benefit of U.S. Provisional Application Ser. No. 62/670,440 filed 11 May 2018, the contents of which are hereby incorporated by reference.

FIELD OF THE INVENTION

The present invention in general relates to vehicle components and in particular, to a reusable wiper blade adapter system for attachment of disposable wiper blades for vehicle windshield wipers.

BACKGROUND OF THE INVENTION

Figure 1A:
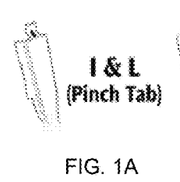
FIGS. 1A-1E illustrate various existing prior art wiper blade arm terminations.
Figure 1B:
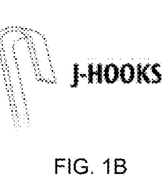
Figure 1C:
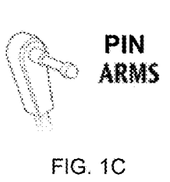
Figures 1D, 1E:
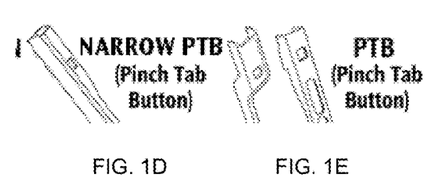

Aftermarket wiper blades are typically sold with one or more adapters to accommodate many of the various designs of wiper blade arms that form a vehicle windshield wiper. As shown in FIGS. 1A-1E, the typical types of wiper blade arms may illustratively include insert and lock (I&L) (FIG. 1A), J-hooks (FIG. 1B), pins (FIG. 1C), pinch tab button (PTB) variants (FIGS. 1D and 1E). In order to install a wiper blade onto a vehicle, the consumer must identify the correct adapter that is compatible with the vehicle wiper arm. As there are many options of these adapters and the many unique mechanisms by which the adapters may fit these wiper arms—the process is not only confusing but could be extremely frustrating to many consumers. Thus, in general, it is desirable to avoid such a process, as part of regular replacements of wiper blades.

Due to the wear of the edge surface of the rubber squeegee that is in contact with the windshield of the vehicle, it is recommended that a wiper blade be replaced every 8 to 12 months. Currently, consumers replace the entire wiper blade which includes the adapter, thus requiring the consumer to go through the frustrating and confusing process of fitting the adapter again onto the complex wiper arm configurations. Furthermore, the adapters are usually made of some type of engineered plastic that does not wear as quickly as the rubber squeegee and does not need to be replaced as often as the wiper blade.

Thus, there exists a need for an improved system and method that enables wiper blades to be replaced without the complexity of removing and reattaching adapters to the wiper arms.

SUMMARY OF THE INVENTION

A wiper blade system includes a reusable adapter configured for a specific wiper blade arm of a vehicle. The system further includes a first connector attached to the adapter, and a second connector attached to a disposable wiper blade, where the second connector is configured to mate with the first connector.

A wiper blade system includes a reusable adapter configured for a specific wiper blade arm of a vehicle. The system further includes a first connector with a set of rails attached to the adapter, and a second connector attached to a disposable wiper blade, where the second connector has a set of opposing slots configured to mate, guide, and retain the set of rails of the first connector.

A method of using the wiper blade system described above includes selecting an adapter based on the type of windshield wiper arm, and attaching the adapter to the windshield wiper arm. The method further includes inserting the second connector into the first connecter, and securing the first connector to the second connector with a locking mechanism.

A method of installing a replacement wiper blade the wiper blade system described above includes removing a worn out wiper blade by moving the locking mechanism to an unlocked position and separating the first connector from the second connector, and inserting the replacement wiper blade by joining the first connector to the second connector. The method further includes securing the replacement blade by advancing the locking mechanism to a locked position.

DETAILED DESCRIPTION OF THE INVENTION

The present invention has utility as a system and method that enables windshield wiper blades to be replaced without the complexity of removing and reattaching adapters to the wiper arms with every wiper blade replacement cycle. Embodiments of inventive wiper blade adapter are reusable and stay connected to the windshield wiper arm while providing a simple connecting system that enables the attachment of the wiper blade to the base of the adapters. Embodiments of the inventive adapter are based on the types of wiper blade arms found on a vehicle, and may illustratively include insert and lock (I&L), hooks, pins, pinch tab button (PTB), per FIGS. 1A-1E. Embodiments of the adapters are made of engineered plastic that does not wear as quickly as the rubber squeegee and does not need to be replaced as often as the wiper blade. Embodiments of the reusable wiper blade adapter employ a simple mating connector on the wiper blade that provides for an intuitive motion to attach and detach from the base of the adapter thus providing for a simpler blade replacement process.

In an inventive embodiment the reusable wiper blade attachment adapter system employs a mechanism similar to those found on a snap buckle. The reusable adapter system has two components: a male and female connector. The male connector has two prongs with protruding surfaces on the outward facing sides. When the prongs are fully inserted into the female connector, the protruding surfaces engage similarly shaped and sized holes or slots within the connector to secure the two components together. A locking mechanism slides over the exposed protrusions to prevent accidental release. Disengagement of the connector requires sliding the locking mechanism back to expose the protrusions. The protrusions would then need to be squeezed and the wiper blade pulled in the opposite direction. It is appreciated that the female connector portion of the adaptor may be joined to the windshield wiper arm and the male connector attached to the replaceable wiper blade, or the male connector may be joined to the windshield wiper arm and the female connector attached to the replaceable wiper blade.

In an inventive embodiment the reusable wiper blade attachment adapter system employs a track and shuttle mechanism. In this inventive embodiment a track is connected to the wiper blade, while a mating shuttle is connected to an adapter connected to the wiper arm. The shuttle has an internal rail that is used to guide and retain the shuttle to the track. The track has an internal slot which matches the shuttle rail to retain the shuttle connector. A sliding locking mechanism slides over to engage the shuttle connector. Once engaged, the two components capture a small protrusion on the track connector and prevents the shuttle connector from disengaging.

Figure 2A:
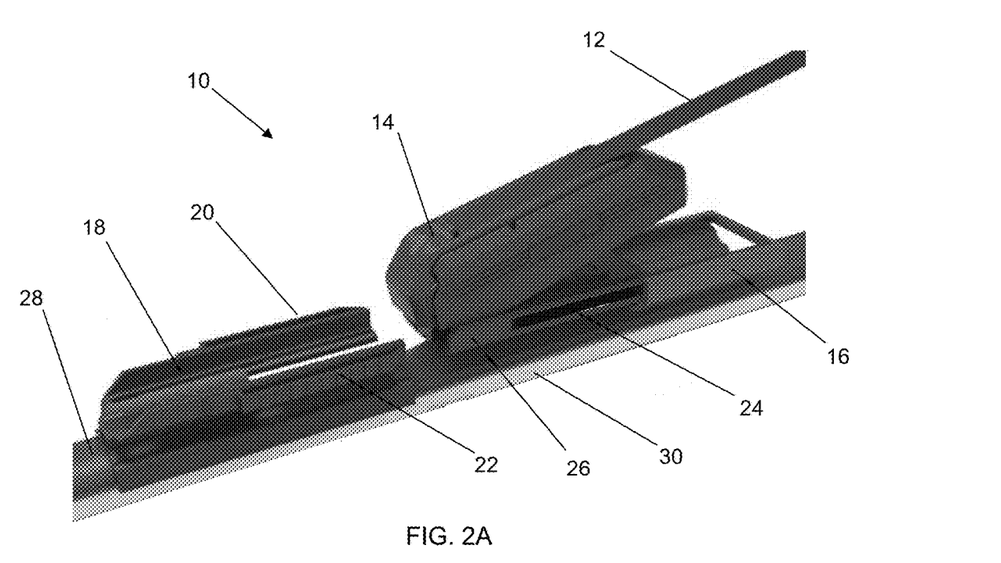
FIG. 2A is a perspective view of a reusable wiper blade adapter joined to wiper blade arm prior to connection to a mating windshield wiper blade in accordance with an embodiment of the invention.
Figure 2B:
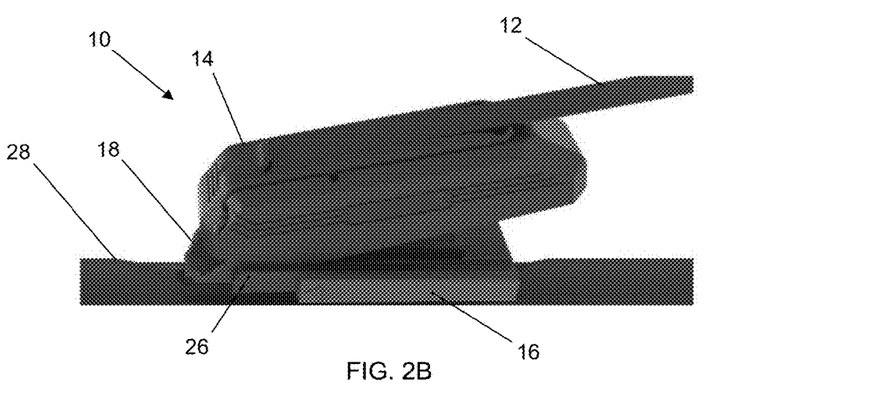
FIG. 2B is a perspective view of the reusable wiper blade adapter of FIG. 2A fully engaged and locking the wiper blade arm to a mating windshield wiper blade in accordance with an embodiment of the invention.

Referring now to the figures, FIG. 2A is a perspective view of a system 10 with reusable wiper blade adapter 14 joined to wiper blade arm 12 prior to connection to a mating windshield wiper blade 28 with an attached male connector 18. The replaceable windshield wiper blade 28 has a squeegee 30 that contacts the vehicle windshield or in certain instances a rear facing window. The male connector 18 has squeezable prongs 20 with protruding surfaces 22. The protruding surfaces 22 engage opposing holes or slots 24 in a female connector 26 that is pivotally joined to the adapter 14. A locking mechanism 16 slides over and locks the engaged protruding surfaces 22 that are in the opposing holes or slots 20 as shown in FIG. 2B.

Figure 3A:
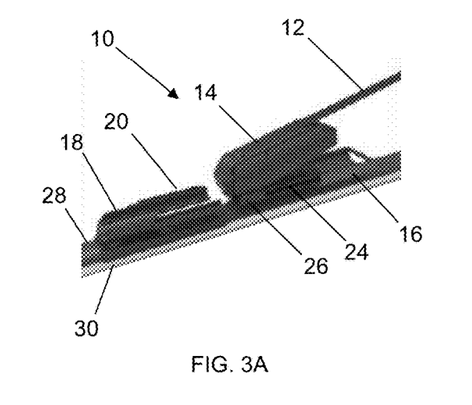
FIGS. 3A to 3C illustrate the steps for attaching the wiper blade arm to the mating windshield wiper blade using the adapter of FIG. 2A in accordance with an embodiment of the invention.
Figure 3B:
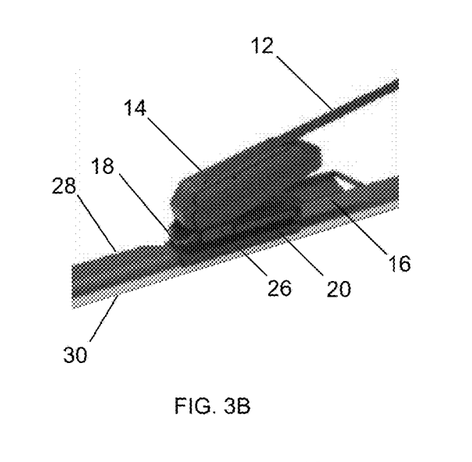
Figure 3C:
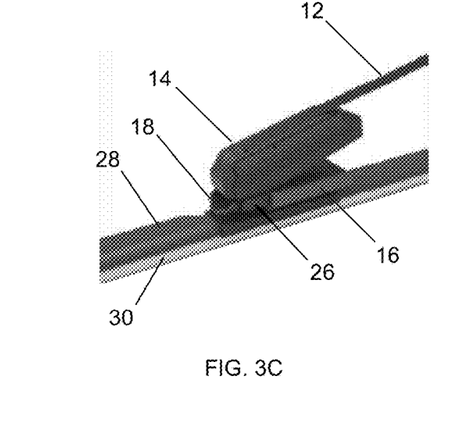

FIGS. 3A to 3C illustrate the successive steps for attaching the wiper blade arm 12 to the mating windshield wiper blade 28 using the reusable adapter 14. The reusable adapter 14 is initially installed on each of the one or more wiper arms 12 of the vehicle, where the type of wiper arm determines the adapter to use. Subsequently, the prongs 20 of the male connector 18 are pinched inward and are inserted into the female connector 26 to engage the opposing holes or slots 24. The locking mechanism 16 is slid forward to secure the female connector 26 to the male connector 18. In order to uninstall a wiper blade 28 the locking mechanism 16 is slid back and the exposed prongs 20 are squeezed while the wiper blade 28 is pulled away from the female connector 26.

Figure 3D:
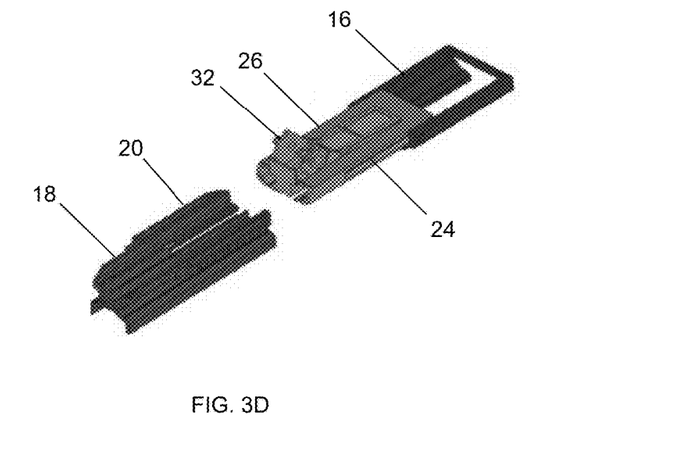
FIGS. 3D to 3F illustrate the steps for attaching the wiper blade arm female connector to the mating wiper blade male connector of the adapter of FIG. 2A with the adaptor, wiper blade arm, and wiper blade removed for visual clarity in accordance with an embodiment of the invention.
Figure 3E:
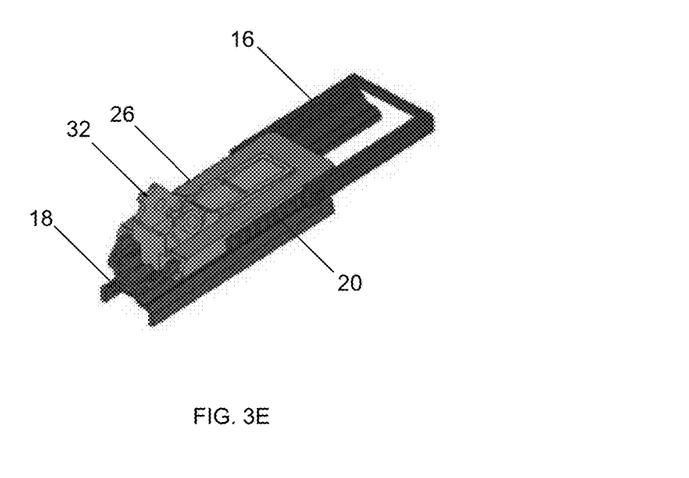
Figure 3F:
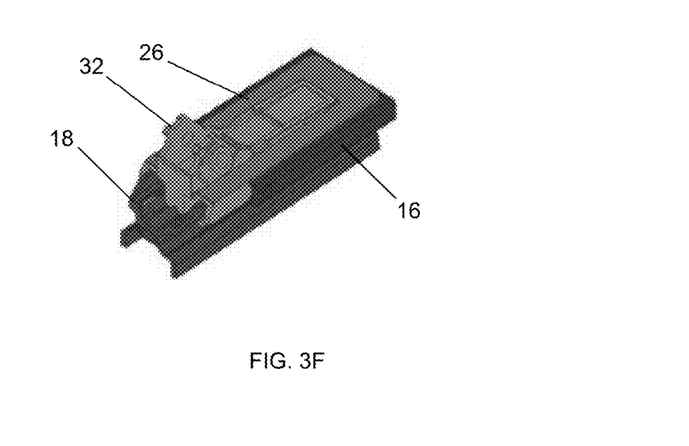

FIGS. 3D to 3F illustrate the steps for attaching the female connector 26 to the mating wiper blade male connector 18 with the adaptor 14, wiper blade arm 12, and wiper blade 28 removed for visual clarity. In FIG. 3D, the male connector 18 and female connector 26 are aligned. In FIG. 3E, the prongs 20 of the male connector 18 are inserted into the opposing holes or slots 24 of the female connector 26. In FIG. 3F, the secondary locking mechanism 16 is slid over the opposing holes or slots 24 to further secure the inserted prongs 20. With the adapter 14 removed the pivot connectors 32 of the female connector 26 are visible. The pivoting connection between the female connector 26 and the adaptor 14 allow the wiper blade 28 to pivot relative to the wiper arm 12.

Figure 4A:
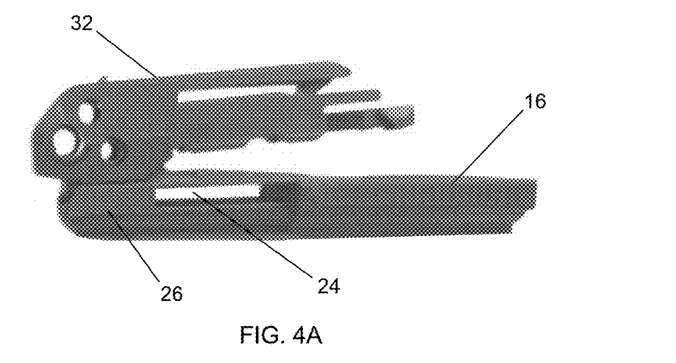
FIG. 4A is a side perspective view of the wiper blade adapter of FIG. 2A without a cover and prior to attachment to a wiper blade arm in accordance with an embodiment of the invention.
Figure 4B:
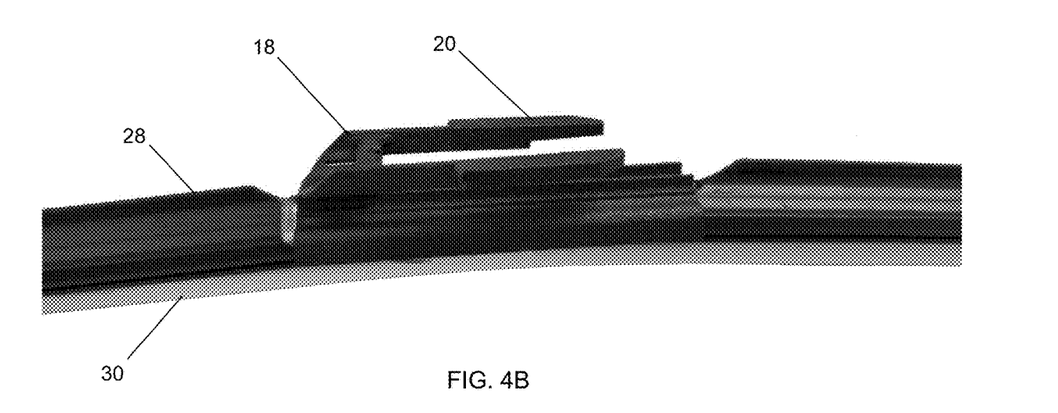
FIG. 4B is a perspective view of a wiper blade with the connector of FIG. 2A for use with the wiper blade adapter of FIGS. 2A and 4A.

FIG. 4A is a side perspective view of the reusable wiper blade adapter 32 and female connector 26 of FIG. 2A without a cover and prior to attachment to a wiper blade arm. FIG. 4B is a perspective view of a disposable wiper blade 28 with the male connector 18 attached. It is appreciated that wiper blades 28 may be sold with the male connector 18 pre-fitted to the wiper blade 28.

Figure 5A:
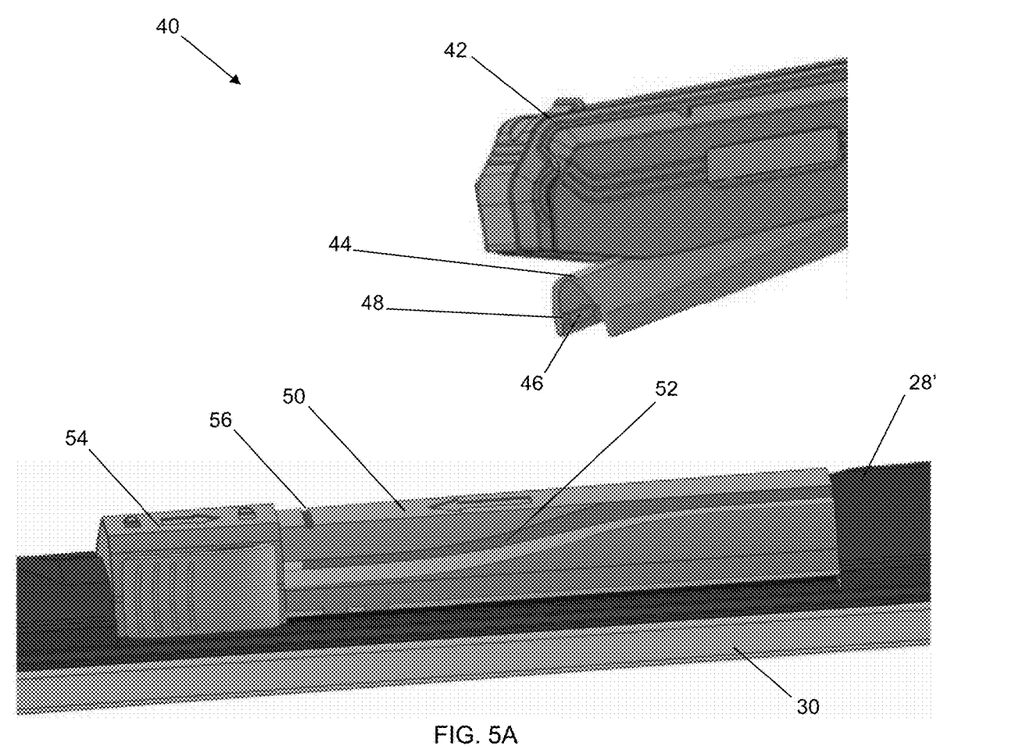
FIG. 5A is a perspective view of a reusable wiper blade adapter with the wiper blade arm not shown prior to connection to a mating windshield wiper blade in accordance with an embodiment of the invention.
Figure 5B:
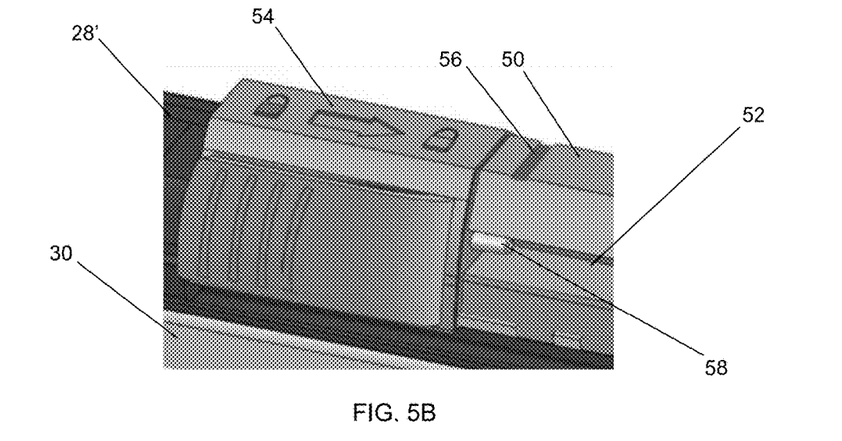
FIG. 5B is a close up perspective view of the locking mechanism of the mating windshield wiper blade of FIG. 5A in accordance with an embodiment of the invention.

FIG. 5A is a perspective view of a system 40 with a reusable wiper blade adapter 42 joined to wiper blade arm (not shown) with a pivoting shuttle connector 44 with a set of internal rails 46 prior to connection to a mating windshield wiper blade 28' that has an attached slide track connector 50. An opposing set of slots 52 guide and retain the internal rails 46 of the shuttle connector 44. A sliding locking mechanism 54 slides over to engage and lock the shuttle connector 44 to the slide track connector 50. Locating holes 48 on the leading edge of the internal rails 46 engage with locating pins 58 on the slide track connector 50. Once engaged, the sliding lock mechanism 54 captures a small protrusion 56 on the slide track connector 50 and prevents the shuttle connector 44 from disengaging. FIG. 5B is a close-up perspective view of the locking mechanism of the mating windshield wiper blade 28' of FIG. 5A.

Figure 6A:
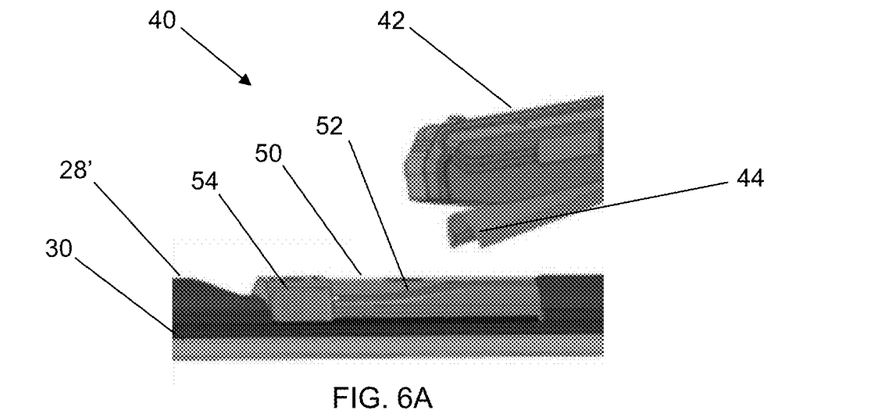
FIGS. 6A-6C illustrate the steps for attaching the wiper blade arm to the mating wiper blade using the adapter of FIG. 5A in accordance with an embodiment of the invention.
Figure 6B:
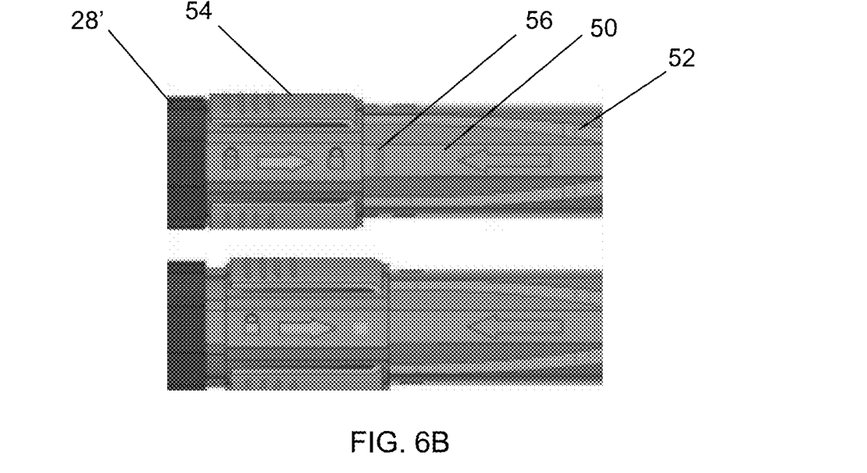
Figure 6C:
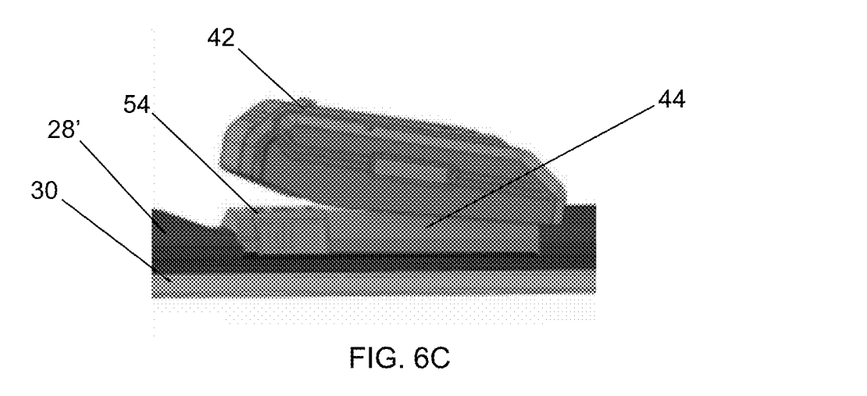

FIGS. 6A-6C illustrate the steps for attaching the wiper blade arm (not shown) to the mating wiper blade 28' using the adapter 42 of FIG. 5A. The adapter is attached to a wiper arm (not shown). In FIG. 6A the shuttle connector 44 is aligned with the slide track connector 50 and the rails 44 are inserted into the slots 52. FIG. 6B illustrates the sliding and locking action of the locking mechanism 54. FIG. 6C shows the adapter 42 connected and locked to the windshield wiper 28'. In order to uninstall a wiper blade 28' the locking mechanism 54 is slid back and the shuttle connector 44 is pulled from the slide track connector 50 while the wiper blade 28' is pulled away. It is appreciated that wiper blades 28' may be sold with the slide track connector 50 pre-fitted to the wiper blade 28'.

Figure 7:
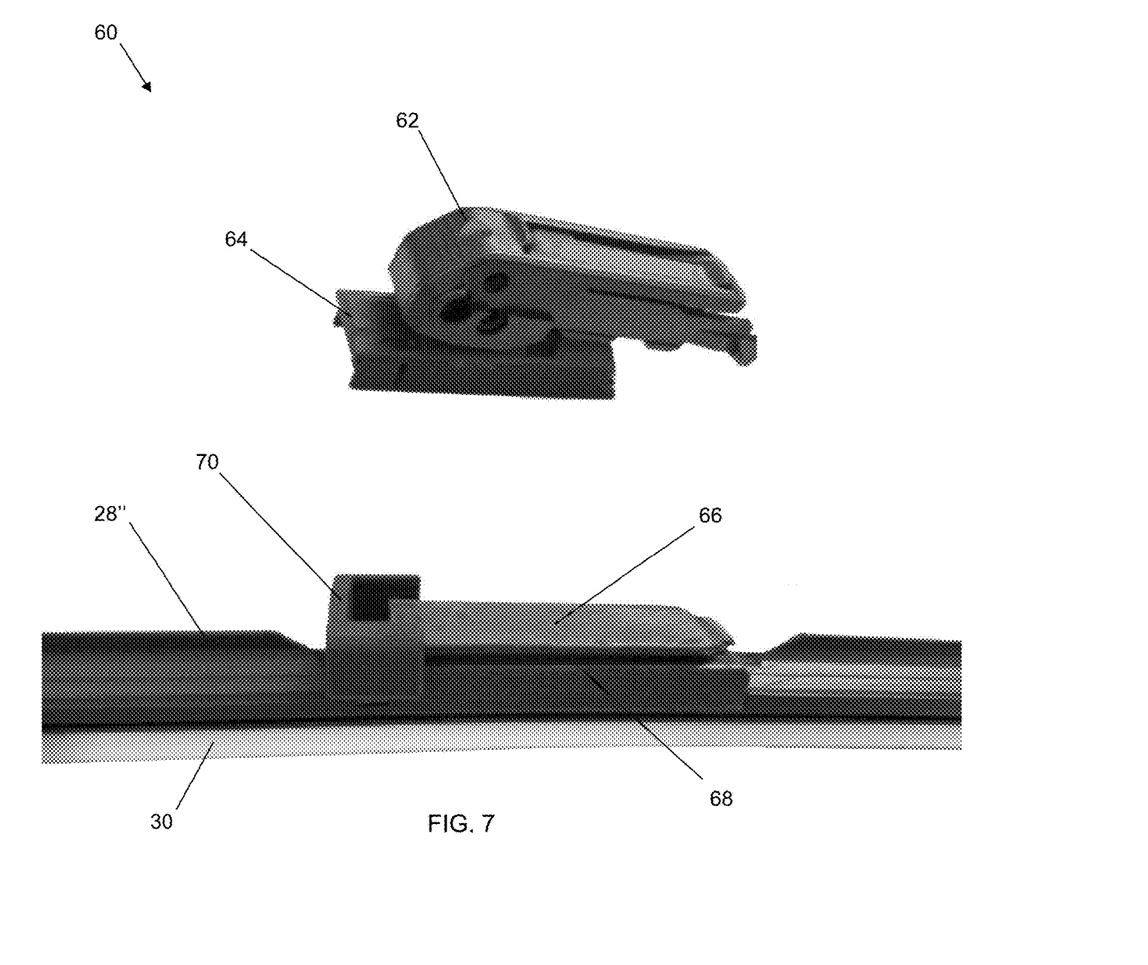
FIG. 7 is a side perspective view of a wiper blade adapter prior to attachment to a wiper blade arm and a mating connector attached to a windshield wiper blade in accordance with an embodiment of the invention.
Figure 8A:
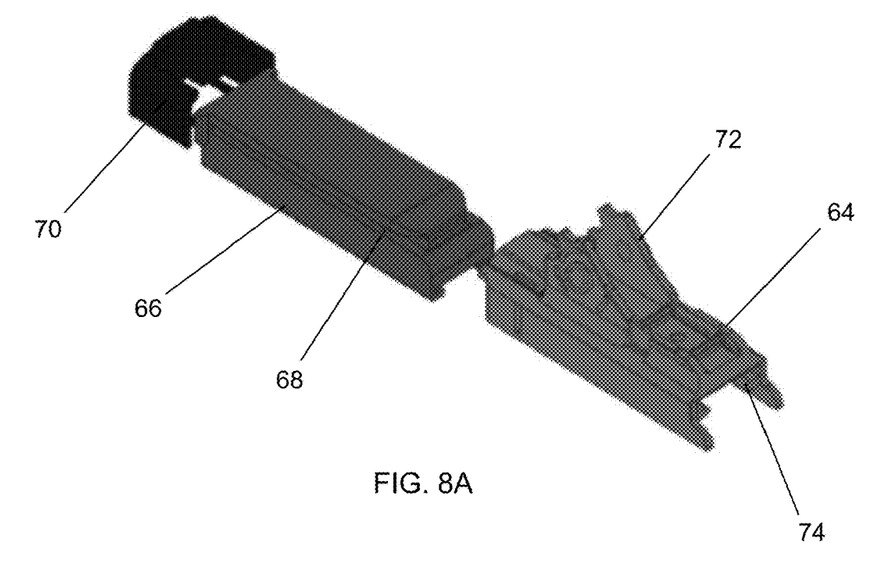
FIGS. 8A-8C illustrate the steps for attaching the wiper blade adapter of FIG. 7 to the mating connector in accordance with an embodiment of the invention.
Figure 8B:
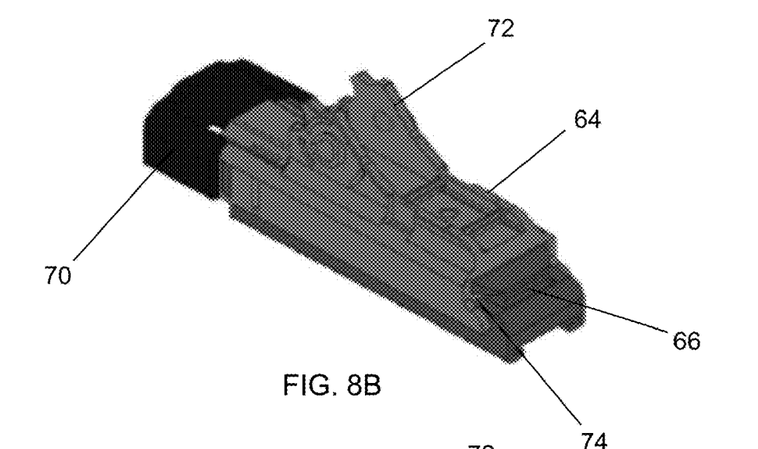
Figure 8C:
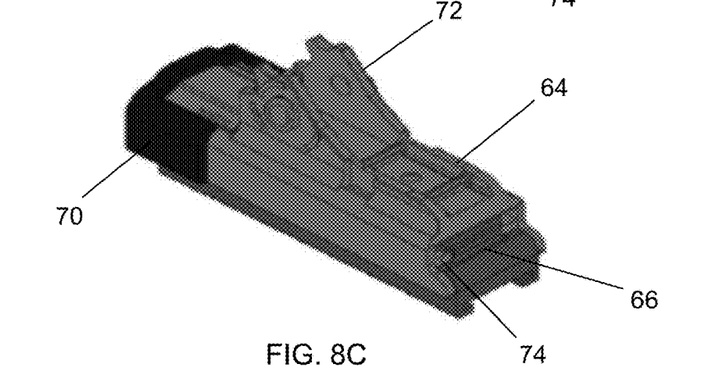

FIG. 7 is a perspective view of a system 60 with a reusable wiper blade adapter 62 joined to wiper blade arm (not shown) with a pivoting shuttle connector 64 with a set of internal rails 74 (as shown in FIGS. 8A-8C) prior to connection to a mating windshield wiper blade 28" that has an attached slide track connector 66. An opposing set of slots 68 guide and retain the internal rails 74 (as shown in FIGS. 8A-8C) of the shuttle connector 64. A sliding locking mechanism 54 (as shown in FIGS. 5A-5B; 6A-6C) slides over to engage and lock the shuttle connector 64 to the slide track connector 66. Once engaged, a sliding lock mechanism 70 captures the shuttle connector 64 and prevents the shuttle connector 64 from disengaging.

FIGS. 8A-8C illustrate the steps for attaching the wiper blade adapter 62 of FIG. 7 to the mating slide track connector 66. In FIG. 8A the pivoting shuttle connector 64 with the set of internal rails 74 is aligned with the set of slots 68 of the slide track connector 66. In FIG. 8B the slide track connector 66 is inserted into the shuttle connector 64. In FIG. 8C the sliding lock mechanism 70 captures the shuttle connector 64 and prevents the shuttle connector 64 from disengaging.

A business method is also provided in which a point of sale retail display of a wiper refill system as described above in the previous embodiments offers an innovative wiper blade solution, different than anything currently in the automotive aftermarket. The connector system is designed to facilitate easy replacement of the wiper blade without re-installation of the wiper blade adapter to the wiper arm. Retail packaging for a reusable J-Hook adapter is offered for sale. A consumer makes a one-time purchase of a set of adapters based on the type of windshield wiper blade arms on their vehicle. The consumer then selects the size and type of windshield wiper blade to use with the adapter. It is appreciated that the wiper blade has a compatible connector to join to the adapter. A retail packaging for a mating windshield wiper blade for use with the reusable adapter is thus provided. A retail display is also contemplated that offers for sale various windshield wiper arm adapters and packages of various sized windshield wiper blades.

As a person skilled in the art will recognize from the previous detailed description and from the figures and claims, modifications and changes can be made to the preferred embodiments of the invention without departing from the scope of this invention defined in the following claims.

The invention claimed is:

1. A wiper blade system comprising:
a reusable adapter configured for a specific wiper blade arm of a vehicle;
a first connector having opposing holes or slots;
a second connector having a set of squeezable prongs with protruding surfaces disposed on external sides of said second connector, said second connector configured to mate with said first connector wherein said squeezable prongs are configured to be inserted into said first connector and said protruding surfaces are configured to engage said opposing holes or slots in said first connector; and
a locking mechanism configured to slide over the opposing holes or slots of the first connector and cover said protruding surfaces when said protruding surfaces are engaged with said opposing holes or slots in said first connector;
wherein one of said first connector and said second connector is attached to said adapter and the other one of said first connector and said second connector is attached to a disposable wiper blade.

2. The system of claim 1 wherein said first connector is a female and said second connector is male.

3. The system of claim 1 wherein said first connector is pivotably attached to said adapter.

4. The system of claim 1 wherein said specific wiper blade arm further comprises one or more of insert and lock (I&L), hooks, pins, or pinch tab button (PTB).

5. The system of claim 1 wherein said adapter is made of engineered plastic.

6. A wiper blade system comprising:
a reusable adapter configured for a specific wiper blade arm of a vehicle;
a first connector with a set of internally protruding rails attached to said adapter;
a second connector attached to a disposable wiper blade, said second connector having a set of opposing slots configured to slidably mate, guide, and retain the set of internally protruding rails of said first connector; and
a sliding locking mechanism configured to slide longitudinally along said second connector over said first connector and engage a small protrusion on an external surface of said second connector.

7. The system of claim 6 further comprising a set of locating holes on a leading edge of said rails that engage a set of locating pins on said second connector.

8. The system of claim 6 wherein said first connector is pivotably attached to said adapter.

9. The system of claim 6 wherein said specific wiper blade arm further comprises one or more of insert and lock (I&L), hooks, pins, or pinch tab button (PTB).

10. The system of claim 6 wherein said adapter is made of engineered plastic.

11. A method of installing a replacement wiper blade comprising:
removing a worn out wiper blade from the system of claim 1 by moving said locking mechanism to an unlocked position and separating said first connector from said second connector;
inserting said replacement wiper blade by joining said first connector to said second connector; and
securing said replacement blade by advancing said locking mechanism to a locked position.

* * * * *